(12) United States Patent
Startup et al.

(10) Patent No.: US 12,273,134 B2
(45) Date of Patent: Apr. 8, 2025

(54) DIFFERENTIAL DETECTION OF SPREAD SPECTRUM WAKEUP CODES

(71) Applicant: ViaSat, Inc., Carlsbad, CA (US)

(72) Inventors: James Startup, Carlsbad, CA (US); Jeremy Pruitt, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 291 days.

(21) Appl. No.: 17/801,676

(22) PCT Filed: Feb. 26, 2021

(86) PCT No.: PCT/US2021/020110
§ 371 (c)(1),
(2) Date: Aug. 23, 2022

(87) PCT Pub. No.: WO2021/174136
PCT Pub. Date: Sep. 2, 2021

(65) Prior Publication Data
US 2023/0125861 A1    Apr. 27, 2023

Related U.S. Application Data

(60) Provisional application No. 62/982,739, filed on Feb. 27, 2020.

(51) Int. Cl.
*H04B 1/12* (2006.01)
*H04W 52/02* (2009.01)
*H04B 1/7163* (2011.01)

(52) U.S. Cl.
CPC .......... *H04B 1/12* (2013.01); *H04W 52/0229* (2013.01); *H04B 1/7163* (2013.01)

(58) Field of Classification Search
CPC .... H04B 1/12; H04B 1/7163; H04W 52/0229
See application file for complete search history.

(56) References Cited

U.S. PATENT DOCUMENTS

| 5,428,647 A | 6/1995 | Rasky et al. |
|---|---|---|
| 5,581,547 A | 12/1996 | Umeda et al. |

(Continued)

FOREIGN PATENT DOCUMENTS

| CN | 109600822 B | 10/2019 |
|---|---|---|
| CN | 110768694 A | 2/2020 |

(Continued)

OTHER PUBLICATIONS

"International Search Report and Written Opinion for App No. PCT/US2021/020110", Jun. 1, 2021, 12 pages.

(Continued)

*Primary Examiner* — Junpeng Chen
(74) *Attorney, Agent, or Firm* — Murphy, Bilak & Homiller, PLLC

(57) ABSTRACT

Methods, systems, and devices for a wakeup receiver operation is described. The apparatus may include a splitter that splits a received signal into a first component signal and a second component signal. The signal may include a code sequence, where each symbol of a plurality of symbols of the code sequences includes one of a set of sub-sequences. The apparatus may delay the first component signal and multiply the first component signal with the delayed first component signal and delay the second component signal and multiply the second component signal with the delayed second component signal to generate a first and second output. The apparatus may also determine a representation of the code sequence based on a sequence of levels of the first output and the second output over the plurality of symbols.

21 Claims, 6 Drawing Sheets

(56) References Cited

U.S. PATENT DOCUMENTS

| | | |
|---|---|---|
| 6,567,484 B1 | 5/2003 | Hirota et al. |
| 6,658,048 B1 | 12/2003 | Valio |
| 7,065,328 B1 | 6/2006 | Forster et al. |
| 7,260,372 B2 * | 8/2007 | Forster .................. G01S 19/36 455/248.1 |
| 7,295,601 B1 | 11/2007 | Sinha et al. |
| 8,098,692 B2 | 1/2012 | Albu et al. |
| 8,306,172 B2 | 11/2012 | Kelleher et al. |
| 8,391,415 B2 | 3/2013 | Kelleher et al. |
| 8,442,095 B2 | 5/2013 | Ahmed et al. |
| 9,065,698 B2 | 6/2015 | Shirakata et al. |
| 9,413,403 B2 | 8/2016 | Wentzloff et al. |
| 10,759,384 B2 | 9/2020 | Perissakis et al. |
| 2006/0198473 A1 | 9/2006 | Chiodini |
| 2012/0069893 A1 * | 3/2012 | Shirakata ............ H04L 25/0262 375/239 |
| 2012/0170680 A1 * | 7/2012 | Stern .................. H04L 5/0039 375/299 |
| 2017/0178435 A1 * | 6/2017 | Posch ................ G07C 9/00309 |
| 2019/0289549 A1 * | 9/2019 | Lim ................ H04W 52/0219 |

FOREIGN PATENT DOCUMENTS

| | | |
|---|---|---|
| EP | 1015908 B1 | 4/2009 |
| EP | 2680522 A1 | 1/2014 |
| KR | 100835054 B1 | 6/2008 |
| WO | 02067454 A1 | 8/2002 |
| WO | 2018075926 A1 | 4/2018 |

OTHER PUBLICATIONS

Demirkol, Ilker, et al., "Wake-Up Receivers for Wireless Sensor Networks: Benefits and Challenges", IEEE Wireless Communications, Aug. 2009, pp. 88-96.

Mangal, Vivek, "Clockless, Continuous-Time Analog Correlator Using Time-Encoded Signal Processing Demonstrating Asynchronous CDMA for Wake-Up Receivers", IEEE Journal of Solid-State Circuits, vol. 55, No. 8, Aug. 2020, pp. 2069-2018.

Mangal, Vivek, et al., "A-80.9dBm 450MHz Wake-Up Receiver with Code-Domain Matched Filtering using a Continuous-Time Analog Correlator", , Jun. 2, 2019, Jun. 2, 2019, pp. 259-262.

* cited by examiner

DIFFERENTIAL DETECTION OF SPREAD SPECTRUM WAKEUP CODES

BACKGROUND

The following relates generally to receivers and more specifically to wakeup receivers and signal detection.

A low power receiver coupled with an electronic device may wake up the electronic device based on a signal received from a transmitter. In some examples, the receiver may compare the incoming signal with a stored code and generate a wakeup command for the electronic device based on the comparison. In some cases, the receiver may utilize an envelope detector circuit (e.g., a peak detector) to convert the incoming signal to baseband where it may be detected and decoded to avoid the use of local oscillators and conserve power. In such examples, some of the energy of the incoming signal may be spread to harmonics instead of being converted to the baseband—e.g., half the energy or more of the incoming signal. Accordingly, the receiver may incorrectly determine an incoming signal is not associated with a wakeup command based on the energy loss. Thus, reception of wakeup commands may present challenges for lower power detection.

SUMMARY

The described techniques relate to improved methods, systems, devices, and apparatuses that support differential detection of spread spectrum wakeup codes. The apparatus may include a splitter that splits a received signal into a first component signal and a second component signal. The signal may include a code sequence, where each symbol of a plurality of symbols of the code sequences includes one or more repetitions of one of a set of sub-sequences and each sequence having a corresponding code length. The apparatus may include a first correlation chain that may delay the first component signal by a first amount and multiply the first component signal with the delayed first component signal to generate a first output, where the first amount is associated with a first one of the code lengths. The apparatus may include a second correlation chain that may delay the second component signal by a second amount and multiply the second component signal with the delayed second component signal to generate a second output, where the second amount is associated with a second one of the code lengths. The apparatus may also include a controller that receives the first output and the second output and determines a representation of the code sequence based a sequence of levels of the first output and the second output over the plurality of symbols.

DETAILED DESCRIPTION

Figure 1:
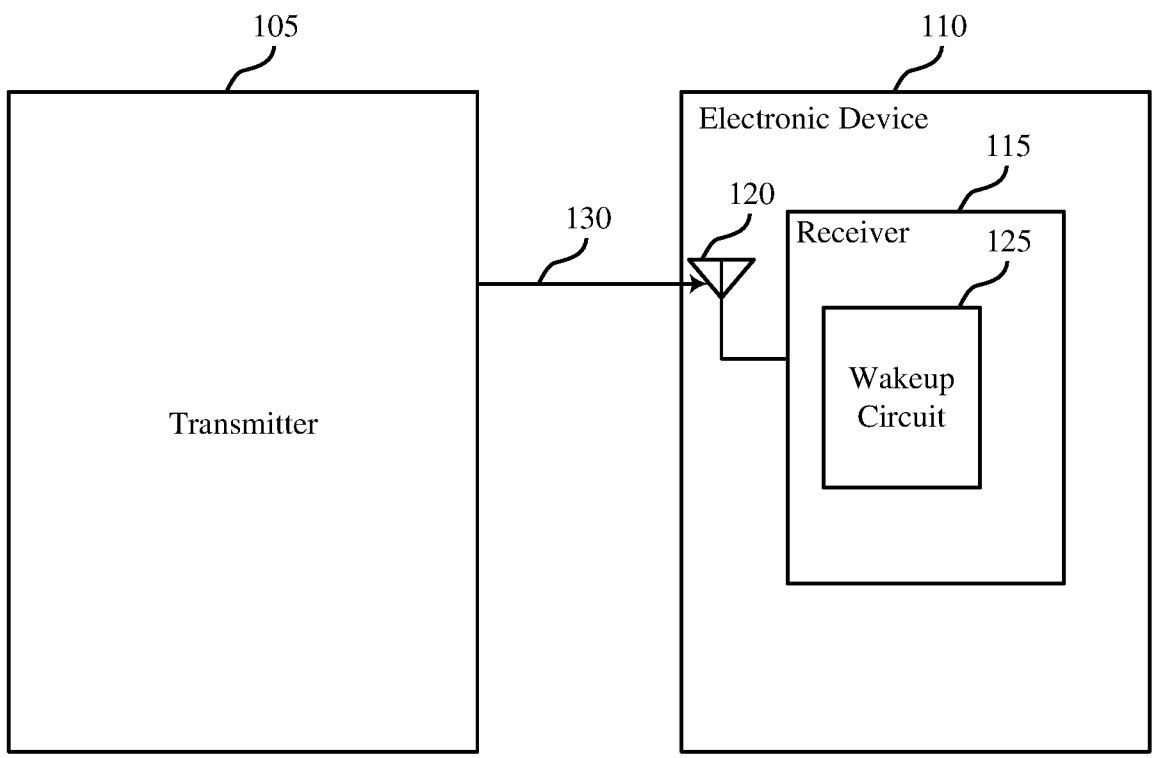
FIG. 1 illustrates an example of a system that supports differential detection of spread spectrum wakeup codes in accordance with aspects of the present disclosure.

A system may include a transmitter and an electronic device including a receiver. In some examples, the receiver may be a low power receiver that activates the electronic device based on a signal from the transmitter—e.g., the electronic device may consume a relatively large amount of power and may remain deactivated when not in use to conserve power. For example, the receiver may be a wakeup receiver, coupled with a high-power radio transceiver, that activates the transceiver based on a signal received from the transmitter. In some examples, utilizing the low power receiver may prolong battery life of the electronic device. In some examples, the receiver may convert the signal from the transceiver into a baseband signal (e.g., modulated symbols). In some cases, the receiver may utilize an envelope detector circuit (e.g., a peak detector) or another type of circuit to provide down-conversion of the incoming signal to the baseband signal where it can be detected and decoded. In some examples of these techniques, half or more of the energy of the incoming signal is spread to harmonics instead of the baseband signal. In some examples, a receiver may also be limited in a type of modulation the receiver may implement—e.g., the receiver may be limited to modulating the incoming signal with bits of a sequence using On-Off-Keying (OOK) or frequency shift keying (FSK). For example, an OOK modulation may include less energy (e.g., only half the information is transmitted) and detecting the difference between a bit with no energy and a bit with energy may be difficult. In other examples, an FSK modulation may use two tones and cause a received signal to undergo two (2) or more conversions causing significant energy loss—e.g., the signal may be mixed twice and energy may be dissipated to harmonics multiple times. Because the signal may have less energy using OOK or FSK modulation, the ability of a receiver to detect a signal including a wakeup command may be diminished.

As described herein, a receiver may detect a code sequence associated with a received signal that is encoded in symbols that are subsequences of different lengths by determining the lengths of the subsequences—e.g., without decoding the symbols. For example, the receiver may split a received signal into multiple paths, delay each respective signal and multiply the respective delayed signals with the non-delayed signals to auto-correlate symbols of the signal. In some examples, these techniques may detect most of the energy associated with the signal at baseband. In such examples, the received signal may comprise a code sequence, where each symbol of a plurality of symbols of the code sequence comprises one or more repetitions of one of a set of sub-sequences having corresponding code lengths. For example, the receiver may split an RF signal received from an antenna into a first component RF signal and a second component RF signal. The receiver may then delay the first component RF signal by a first amount and multiply (e.g., via a mixer) the delayed first component RF signal with the first RF component signal to generate a first output. The receiver may also delay the second component RF signal by a second amount and multiply the delayed second component RF signal with the second RF component signal to generate a second output. In some examples, the delay amount may be associated with a code length of a respective sub-sequence of the set of sub-sequences. Accordingly, the first correlation chain or second correlation chain may generate a high state (e.g., high energy) when there is a correlation between the delayed RF signal and the non-delayed RF signal and a low state (e.g., low energy) when there is not a correlation between the delayed RF signal and the non-delayed RF signal—e.g., based on determining the length of a given subsequence. In some examples, an output with high energy may be associated with correspondence between the delay line length and the subsequence and enable the receiver to associate a logic state to the respective output. Additionally, an output with low energy may provide further confirmation that the output with high energy indicates the correspondence between the delay line length and the respective sub-sequence—e.g., a low output by itself may not be indicative of anything but detecting low energy at an output when the other output indicates high energy provides confidence in the first output. The receiver may generate respective outputs for each symbol of the RF signal as described herein.

In some cases, the receiver may include a controller that receives each of the outputs across the plurality of symbols. The controller may determine a representation of the code sequence received based on outputs received—e.g., based on the lengths of the sub-sequences. That is, each output received from the first correlation and second correlation chain may represent a length of a sub-sequence and the controller may utilize the set of sub-sequence lengths received to determine the overall sequence. In some examples, the controller may cross correlate the determined sequence with a stored sequence associated with the receiver. If the determined sequence cross correlates with the stored sequence, the controller may generate a wakeup command for an electronic device coupled with the receiver.

By auto-correlating a received RF signal with itself, a receiver may consume less power (e.g., by refraining from using a local oscillator) and may reduce the spread of the energy of the RF signal to harmonics—e.g., the RF signal may be converted into baseband more efficiently and with less energy loss. In such examples, the receiver may also utilize additional modulation schemes. For example, the receiver may utilize phase modulation that conserve more energy than FSK or OOK and increases sensitivity. For example, the receiver may use phase-shift keying (PSK) such as quadrature phase shift keying (QPSK) or binary phase-shift keying (BPSK). In other examples, the receiver may use amplitude shift keying (ASK) techniques. The receiver may have an increased sensitivity and may more accurately determine if received RF signals are associated with a wakeup command based on the autocorrelation.

Aspects of the disclosure are initially described in the context of a system, circuits, and devices. Specific examples are then described of a wakeup circuit and associated timing diagrams. Aspects of the disclosure are further illustrated by and described with reference to apparatus diagrams and flowcharts that relate to oversampled multiple-correlator symbol synchronization.

FIG. 1 illustrates an example of a system 100 that supports differential detection of spread spectrum wakeup codes in accordance with aspects of the present disclosure. The system 100 may include a transmitter 105 and an electronic device 110. The electronic device 110 may include a receiver 115. The receiver 115 may include an antenna 120 and a wakeup circuit 125.

The transmitter 105 may be configured to transmit a signal 130 to the electronic device 110. In some examples, the transmitter 105 may transmit a radio frequency (RF) signal 130 to activate the electronic device 110, provide timing recovery to electronic device 130, or provide other instructions to electronic device 110. In some cases, the transmitter 105 may transmit a signal 130 at a carrier frequency modulated with a wakeup sequence at a symbol rate. In some cases, the transmitter 105 may transmit an signal 130 including a code sequence, where each symbol of a plurality of symbols of the code sequence comprises a plurality of repetitions of one of a set of sub-sequence having corresponding lengths. For example, the transmitter 105 may transmit a code sequence 101 where a first symbol may have one or more repetitions of a first sub-sequence having a first length associated with a logic value of '1,' a second symbol may have one or more repetitions of a second sub-sequence having a second length associated with a logic value of '0,' and a third symbol may have one or more repetitions of the first sub-sequence having the first length. In other examples, the transmitter 105 may also be configured to transmit data to the electronic device 110.

Electronic device 110 may be an example of a high-power radio transceiver or other electronic package. For example, electronic device 110 may be an example of a light, a siren, a satellite terminal, a two-way radio (e.g., walkie-talkie), or other internet of things (IoT) device. For instance, electronic device 110 may be a high-power radar configured to scan its surroundings (e.g., an amount of water remaining in a water tank). In some examples, electronic device 110 may be battery powered. In other examples, electronic device 110 may consume a relatively large amount of power. In such examples, the electronic device 110 may be remain deactivated (e.g., powered off) except for the receiver 115 to reduce power consumption. In some cases, the electronic device 110 may be activated based on an signal 130 received from the transmitter 105. In other examples, electronic device 110 may initiate an operation or function based on the signal 130 received from the transmitter 105. In some examples, the electronic device 110 may also be configured to receive data from the transmitter 105 when the electronic device 110 is activated.

Receiver 115 may be an example of a wakeup receiver. That is, receiver 115 may be configured to consume low amounts of power while remaining activated (e.g., powered on) and monitoring for an RF signal 130 from the transmitter 105. In other examples, receiver 115 may be configured to provide timing recovery for the electronic device 110 or provide instructions to the electronic device 110 based on a specific RF signal 130 received. In some examples, the receiver may include an antenna 120 configured to receive the RF signal 130. The receiver 115 may also include a wakeup circuit 125 (e.g., a detection circuit) configured to autocorrelate and cross correlate the received RF signal 130 with a stored code associated with the receiver 115. In some examples, the stored code may be a pseudo-noise (PN) code. The stored code may be stored at the receiver during an initialization procedure. In some examples, the receiver 115 may be programmed to monitor incoming signals to determine if the incoming signal corresponds to the stored code. In some examples, the stored code may be unique to the receiver 115. In other examples, several receivers 115 may share a stored code—e.g., such that an incoming signal may activate or otherwise provide instructions to a set of receivers 115 concurrently.

In some examples, the wakeup circuit 125 may generate a wakeup command for the electronic device 110 if an incoming signal 130 is associated with the stored code—e.g., the wakeup circuit 125 may monitor incoming signals 130 and generate a wakeup command based on determining the incoming signal 130 is associated with activating the electronic device 110. Accordingly, the electronic device 110 may conserve power by having the low power receiver 115 monitor incoming signals 130 and activating when requested by the transmitter 105. In other examples, the wakeup circuit 125 may generate a timing recovery signal, an indication that the electronic device 110 is receiving a message from transmitter 105, or otherwise generate a signal providing instructions to electronic device 110 based on an incoming signal 130 matching the stored code. In some examples, the receiver 115 may also be configured to receive data from the transmitter 105. In other examples, there may be a second receiver in the electronic device configured to receive data from the transmitter 105—e.g., the receiver 115 may be one of a plurality of receivers utilized by the electronic device 110. In other cases, the receiver 115 may be external to the electronic device 110.

Figure 2:
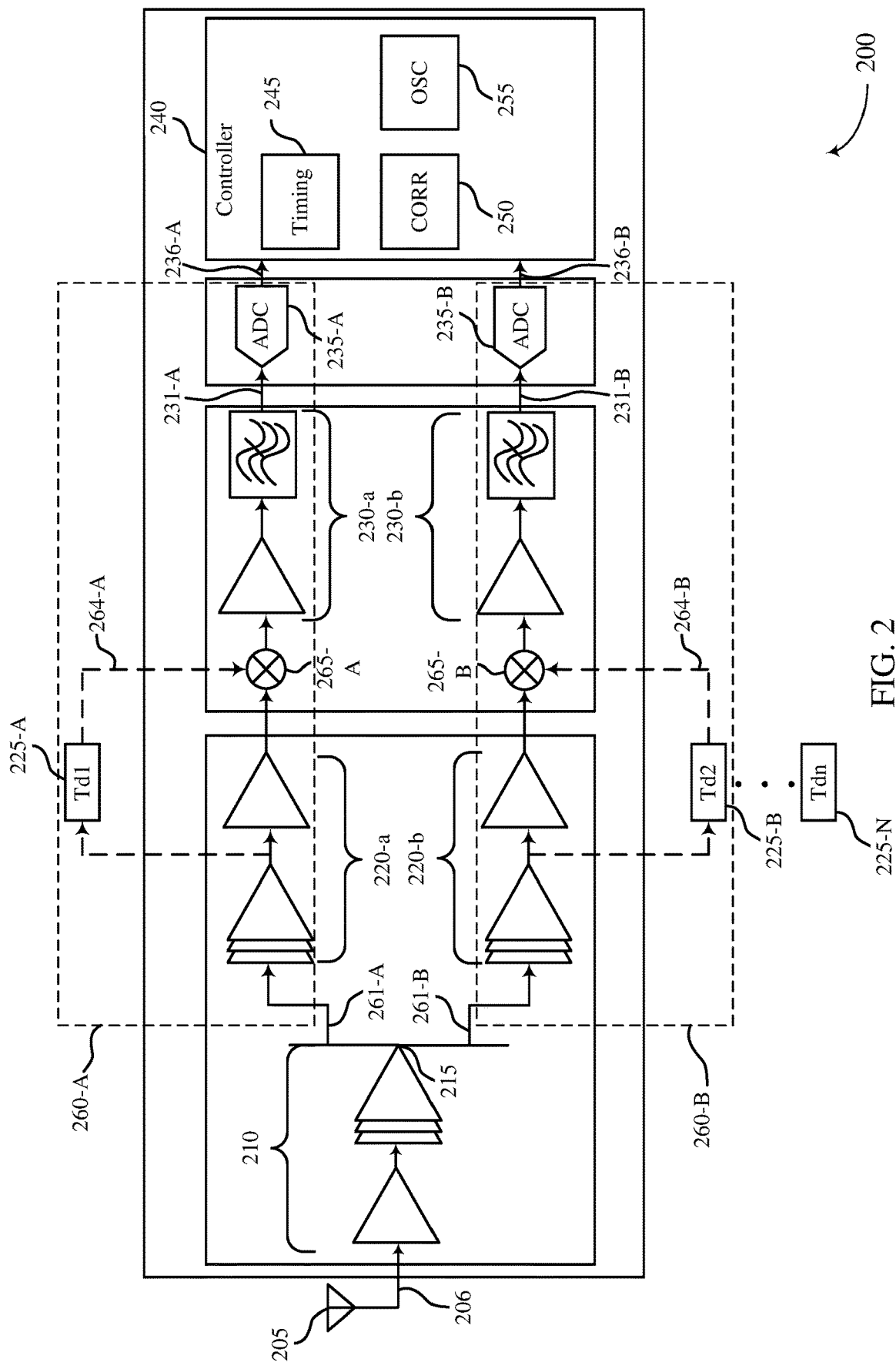
FIG. 2 illustrates an example of a wakeup circuit that supports differential detection of spread spectrum wakeup codes in accordance with aspects of the present disclosure.

FIG. 2 illustrates an example of a wakeup circuit 200 that supports differential detection of spread spectrum wakeup codes in accordance with aspects of the present disclosure. In some examples, the wakeup circuit 200 may be an example of wakeup circuit 125 as described with reference to FIG. 1. That is, the wakeup circuit 200 may be within a low power receiver (e.g., receiver 115 as described with reference to FIG. 1) and coupled with an antenna 205 (e.g., antenna 120 as described with reference to FIG. 1) to receive a signal (e.g., signal 130 as described with reference to FIG. 1) from a transmitter (e.g., transmitter 105 as described with reference to FIG. 1). In some examples, wakeup circuit 200 may be located within an integrated circuit (e.g., IC). That is, the components of the wakeup circuit 200 (e.g., excluding the antenna 205 and delay line filters 220) may be on an integrated circuit. In some examples, either the antenna 205, the delay line filters 220, or both may also be on the IC. The wakeup circuit 200 may include an amplifier circuit 210 and a splitter 215 that splits the signal into components for a first correlation chain 260-*a* and a second correlation chain 260-*b*. Each correlation chain 260 may include an amplifier circuit 220, a delay line filter 225, an integrator 230, and an analog-to-digital circuit (ADC) 235. The wakeup circuit 200 may also include a controller 240. The controller 240 may include a timing component 245, a correlator 250, and an oscillator 255.

Antenna 205 may be configured to receive a signal 206 from a transmitter. In some examples, the signal 206 may be an example of an RF signal. In some examples, the antenna 205 may be configured to receive a signal 206 that includes a code sequence including a plurality of symbols. In some cases, each symbol of the plurality of symbols may include one or more repetitions of one of a plurality of sub-sequences, where each sub-sequence has a corresponding code length. In some examples, each of the sub-sequences may be associated with a respective logic state, which may reflect one or more bits (e.g., 1, 0, 10, 01, 11, 00, etc.). In some examples, the antenna 205 may also be coupled with a transformer. The transformer may be configured to match a first impedance associated with the antenna 205 to a second impedance associated with the amplifier circuit 210.

Amplifier circuit 210 may be configured to amplify the signal 206 received at the antenna 205. In some examples, the amplifier circuit 210 may be coupled to the antenna 205 and a splitter 215. That is, the amplifier circuit 210 may amplify the signal 206 received at the antenna 205 and input the amplified signal to the splitter 215. In some examples, amplifier circuit 210 may include a downconversion circuit. In such examples, amplifier circuit 210 may down convert the signal 206 to an intermediate frequency (IF) or baseband signal—e.g., the amplifier circuit 210 may receive an RF signal 206 and down convert the RF signal 206 into an IF or baseband signal and transmit the IF or baseband signal to the splitter 215.

Splitter 215 may be configured to split the signal received from the amplifier circuit 210 into first component signal 261-*a* and second component signal 261-*b*. That is, splitter 215 may be configured to divide the signal into first component signal 261-*a* and second component signal 261-*b*—e.g., the first component signal 261-*a* may be the same as the second component signal 261-*b*, the first component signal 261-*a* may be a copy of the second component signal 261-*b*, or the first component signal 261-*a* and second component signal 261-*b* may have approximately equal energy (e.g., approximately half of the energy of the original signal received at the splitter 215). In some examples, the splitter 215 may be configured to split the signal received and output a signal 261 to the first correlation chain 260-*a* and the second correlation chain 260-*b*. In some examples, the wakeup circuit 200 may have more than two (2) correlation chains 260—e.g., three (4), four (4), or more correlation chains 260. In such examples, the splitter 215 may be configured to split the received signal to each respective correlation chain 260—e.g., split the signal into a first component signal, a second component signal, and a third component signal when the wakeup circuit 200 includes three correlation chains 260. In some examples, the wakeup circuit 200 may include a quantity of correlation chains 260 based on a size of a given sub-sequence. For example, the wakeup circuit 200 may include two correlation chains 260 based on each symbol containing one (1) bit. In other examples, wakeup circuit 200 may include three correlation chains 260 based on each symbol containing 1.5 bits. In other cases, the wakeup circuit 200 may include four correlation chains 260 based on each symbol containing two bits of data. Additional correlation chains 260 may be added based on additional bits contained in each symbol—e.g., eight correlation chains for three (3) bits in each symbol.

Amplifier circuit 220 may amplify the split signal 261 for each respective correlation chain 260. For example, amplifier circuit 220-*a* may amplify the first component signal 261-*a* from the splitter 215. In other examples, amplifier circuit 220-*b* may amplify the second component signal 261-*b* from the splitter 215. In some examples, amplifier circuit 220 may include an additional splitter to split the signal 261 to a respective delay line filter 225. For example, amplifier circuit 220-*a* may split the signal 261-*a* and transmit identical copies to the delay line filter 225-*a* and node 265-*a*.

Delay line filters 225 may be configured to delay the split signal for each respective correlation chain 260. For example, delay line filter 225-*a* may be configured to delay the first component signal 261-*a* from the amplifier circuit 220-*a*. In other examples, delay line filter 225-*b* may be configured to delay the second component signal 261-*b* from the amplifier 220-*b*. In some examples, the delay line filters 225 may be configured to delay the respective component signals 261 by an amount associated with a code length—e.g., a code length associated with a respective sub-sequence length. For example, the delay line filter 225-*a* may delay the first component signal 261-*a* by a first amount associated with a code length of a first sub-sequence. In other examples, the delay line filter 225-*b* may delay the second component signal 261-*b* by a second amount associated with a code length of a second sub-sequence. Accordingly, each delay line filter 225 may be configured to delay a respective RF signal by an amount n (e.g., at a delay line filter 225-*n*) associated with a code length of an n$^{th}$ sub-sequence. That is, respective delay line filters 225 may delay a given signal 261 by a first amount, a second amount, a third amount . . . or an n amount. In some examples, the sub-sequences may be different pseudorandom noise (PN) spreading codes—e.g., barker codes.

Wakeup circuit 200 may be configured to multiply a respective component signal 261 with a delayed version of the component signal 264 at a node 265. For example, the first correlation chain 260-*a* may multiply the first component signal 261-*a* with the delayed first component signal 264-*a* (e.g., delayed by the first amount) at the node 265-*a*. In other examples, the second correlation chain 260-*b* may multiply the second component signal 261-*b* with the delayed second component signal 264-*b* (e.g., delayed by the second amount) at the node 265-*b*. In some examples, when a code length of a respective sub-sequence of a symbol of the signal 261 matches the delayed version code length, high energy may be seen at baseband. That is, in examples where the splitter receives an RF signal, the wakeup circuit 200 may inherently convert a given RF symbol to baseband by multiplying the RF symbol with a delayed version of itself. In some examples, when a code length of a first sub-sequence matches a code length of the first delay amount, the first correlation chain 260-*a* may generate a first output satisfying a threshold—e.g., the first correlation chain 260-*a* may generate a baseband signal with a high amount of energy. In other examples, when a code length of a respective symbol of the signal does not match the delayed version code length, a low amount energy may be seen at baseband. For example, when a code length of a second sub-sequence does not matches a code length of the second delay amount, the second correlation chain 260-*b* may generate a second output not satisfying a threshold—e.g., the second correlation chain 260-*b* may generate a baseband signal with a low amount of energy. That is, the wakeup circuit 200 may essentially determine the lengths of the sub-sequences based on whether the output is high energy or low energy instead of decoding the sub-sequence to determine a code associated with the sub-sequence.

Integrator 230 may be configured to integrate the result of the multiplication at node 265 and generate an integrated signal for each respective correlation chain 260-*a*. For example, integrator 230-*a* may integrate the result of the multiplication of the first component signal 261-*a* and the delayed first component signal 264-*a* at node 265-*a* and generate a first integrated signal 231-*a*. In other examples, integrator 230-*b* may integrate the result of the multiplication of the second component RF signal 261-*b* and the delayed second component signal 264-*b* at node 265-*b* and generate a second integrated signal 231-*b*.

ADC 235 may be configured to convert a respective integrated signal 231 to one or more samples for each respective correlation chain 260-*a*. For example, ADC 235-*a* may convert the first integrated signal 231-*a* into a first sampled signal (e.g., correlation output 236-*a*) and ADC 235-*b* may convert the second integrated signal 231-*b* into a second sampled signal (e.g., correlation output 236-*b*).

Controller 240 may be configured to receive a respective sampled signal from each respective correlation chain 260-*a* for each respective symbol of the signal. For example, the controller 240 may receive the first correlation output 236-*a* and the second correlation output 236-*b* from ADC 235-*a* and ADC 235-*b* respectively. In some examples, the controller 240 may be configured to associate each set of correlation outputs 236 (e.g., each sampled signal) received with a respective logic state. That is, the controller 240 may associate a logic state with the combination of correlation outputs 236. For example, the controller 240 may associate the logic state based on at least a high correlation output 236 from one correlation chain 260 and in some cases also based on a low correlation output from one or more other correlation chains 260. For example, the controller 240 may associate the logic state having a value of '1' with a high correlation value on the first correlation output 236-*a*. The controller 240 may have further confidence the first correlation output 236-*a* is associated with the value of '1' based on a low correlation value on the second correlation output 236-*b*. In other examples, the controller 240 may associate the correlation outputs 236 with the logic state having a value of '0' when there is a low correlation value at the first correlation output 236-*a* and a high correlation value on the second correlation output 236-*b*. For example, the controller 240 may be configured to associate the first correlation output 236-*a* and the second correlation output 236-*b* with a first logic state (e.g., a logic state having a value '1') based on the integrated and sampled high energy of the baseband signal output via first correlation chain 260-*a* and the integrated and sampled low energy of the baseband signal output via second correlation chain 260-*b*.

In examples where the wakeup circuit 200 includes additional correlation chains 260, the controller 240 may associate additional logic states with different energy patterns—e.g., associate a high correlation value on one of the correlation chains with logic states '01,' '10,' '11,' '00,' '000,' '001,' '011,' etc., based on a quantity of bits in each symbol and the quantity of correlation chains 260. In some cases, each symbol has a same duration and each sub-sequence bit or "chip" time may have a same duration. Different symbols may include different quantities of repetitions of the corresponding subsequences. In some cases, some quantities of repetitions of sub-sequences within a symbol may not be integer values. For example, a symbol duration may include 310 bits or chips, and a first symbol may include 10 repetitions of a first sub-sequence of length 31, while a second symbol may include approximately 6.7 repetitions of a second sub-sequence of length 47. In some examples, chips may be modulated various ways. For example, the chips may be modulated using a PSK modulation scheme (e.g., BPSK, QPSK, etc.) or ASK modulation schemes.

Based on receiving the correlation outputs 236 and associating a logic state with each set of correlation outputs 236, the controller 240 may be configured to determine a representation of the code sequence of the signal as described with reference to FIG. 1—e.g., based on determining the length of each sub-sequence, the controller 240 may determine the representation of the code sequence received. The correlator 250 of the controller 240 may be configured to cross correlate the determined representation of the code sequence with a stored code associated with the receiver (e.g., receiver 115 as described with reference to FIG. 1) and wakeup circuit 200. In some cases, controller IC 240 may be configured to generate a wakeup command for the receiver (or electronic device 110 as described with reference to FIG. 1) if the determined code sequence matches the stored code (e.g., matches exactly or matches using error correction on the received code). In examples where a set of receivers share a stored code, the wakeup circuit 200 may generate a wakeup command for each receiver in the set of receivers. In some examples, the wakeup circuit 200 may generate a timing recovery signal to the receiver—e.g., indicate a start of a message from a transmitter based on the received signal corresponding to the stored code. In some examples, the controller 240 may utilize the timing component 245 (e.g., to generate symbol timing) and oscillator 255 to perform the functions and operations of the controller 240 as described herein.

Figure 3:
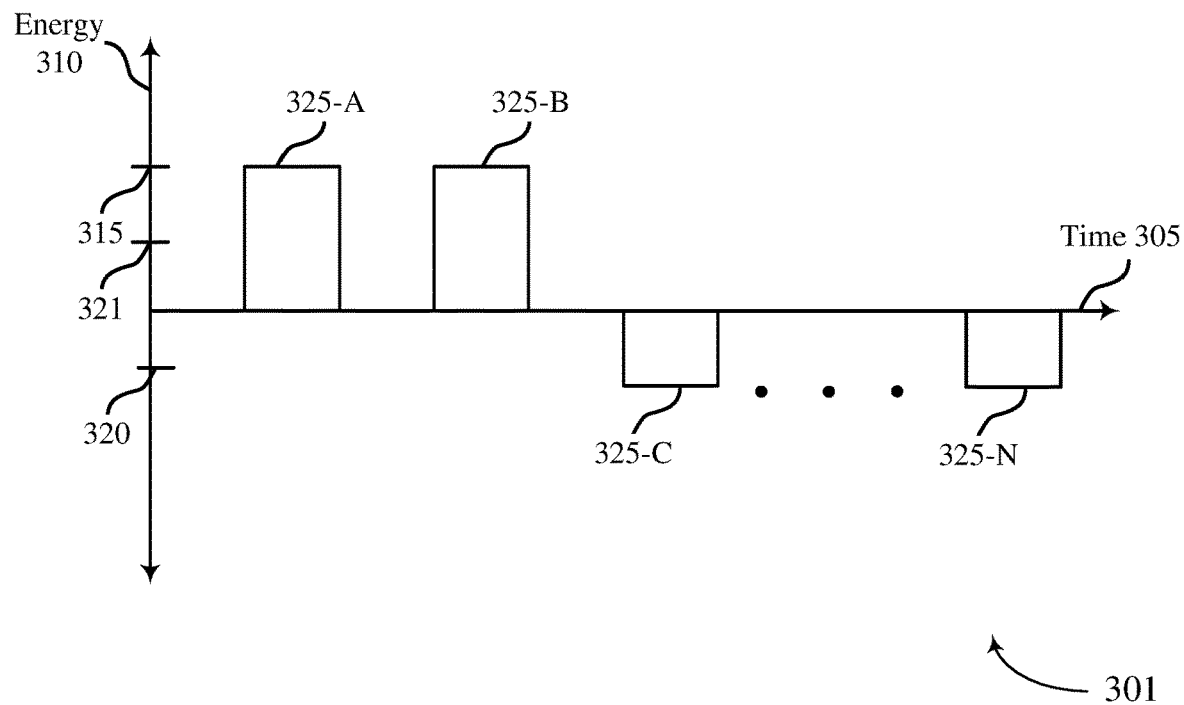
FIG. 3 illustrates an example of a timing diagram that supports differential detection of spread spectrum wakeup codes in accordance with aspects of the present disclosure.
Figure 3:
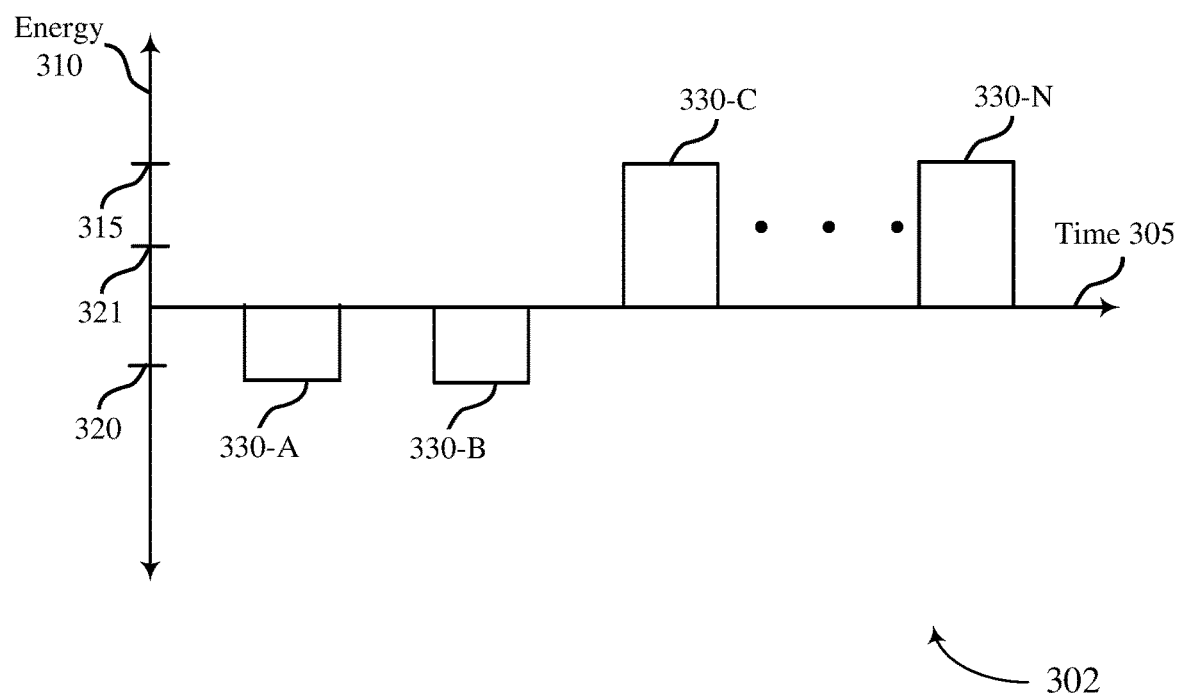

FIG. 3 illustrates an example of a timing diagram 300 that supports differential detection of spread spectrum wakeup codes in accordance with aspects of the present disclosure. In some examples, timing diagram 300 may illustrate the timing of components as described with reference to FIG. 1 and FIG. 2. That is, timing diagram 300 may illustrate a timing diagram for a wakeup circuit (e.g., wakeup circuit 200 as described with reference to FIG. 2). Timing diagram 300 may illustrate outputs (e.g., correlation outputs 236) received at a controller (e.g., controller 240 as described with reference to FIG. 2) from a first correlation chain (e.g., first correlation chain 260-*a*) and a second correlation chain (e.g., second correlation chain 260-*b*) based on receiving a signal (e.g., RF signal) including a plurality of symbols. For example, plot 301 may illustrate an output of the first correlation chain at a given time 305. Plot 302 may illustrate an output of the second correlation chain at a given time 305.

In some examples, a wakeup receiver may receive a signal (e.g., RF signal) comprising a plurality of symbols, where each symbol includes repetitions of one of a plurality of sub-sequences. For example, the wakeup receiver may receive a first symbol of a signal. The wakeup receiver may split the first signal into a first component signal (e.g., first component signal 261-*a* as described with reference to FIG. 2) for a first correlation chain and a second component signal (e.g., second component signal 261-*b* as described with reference to FIG. 2) for a second correlation chain. In some cases, the first correlation chain may delay the first component signal by a first amount and multiply the delayed first component signal with the first component signal as described with reference to FIG. 2. After the multiplication, the wakeup receiver may integrate the resultant first signal energy and an ADC (e.g., ADC 235) may generate a level 325-*a* (e.g., value) of the correlation output (e.g., correlation output 236-*a* as described with reference to FIG. 2) for a controller (e.g., controller 240 as described with reference to FIG. 2). In one example, the controller may detect the first level 325-*a* as having a high energy—e.g., satisfying (e.g., exceeding, or meeting or exceeding) an energy threshold 315. In some cases, the level 325-*a* may be detected as satisfying energy threshold 315 based on the first amount delay matching a code length of the first component signal as described with reference FIG. 2. Similarly, in some cases the second correlation chain may delay the second component signal (e.g., second component RF signal 261-*b* as described with reference to FIG. 2) for the first symbol by a second amount and multiply the delayed second component signal with the second component signal as described with reference to FIG. 2. After the multiplication, the wakeup receiver may integrate the resultant first signal energy and an ADC (e.g., ADC 235) may generate a second level 330-*a* of the correlation output (e.g., correlation output 236-*b* as described with reference to FIG. 2) for the controller. In one example, the controller may detect the second level 330-*a* has having a low energy—e.g., not satisfying the energy threshold 315 based on the second amount delay not matching a code length of the second component RF signal—e.g., based on the length of the sub-sequence not correlating with the second delay amount.

In such examples, based on a combination of the first level 325-*a* satisfying the energy threshold 315, and on the second level 325-*b* not satisfying the energy threshold 315, the controller may determine a first logic state (e.g., a logic '1') associated with the first set of correlation outputs—e.g., the controller may determine the sub-sequence length associated with the first symbol of the signal based on the level 325-*a* satisfying the energy threshold 315 and the level 325-*b* not satisfying the energy threshold 315.

In some examples, the wakeup circuit may similarly generate a level 325 and 330 for a RF symbol—e.g., generate a level 325-*b* for the first correlation chain and a level 330-*b* for the second correlation chain. In some examples, the controller may determine the combination of the first level 325-*a* satisfying the energy threshold 315 and the second level 325-*b* not satisfying the energy threshold 315 is associated with a logic value '1'. In some examples, the wakeup circuit may generate a level 325 and 330 for a third symbol—e.g., generate a level 325-*c* for the first correlation chain and a level 330-*c* for the second correlation chain. In some examples, the controller may determine the combination of the first level 325-*a* failing to satisfy the energy threshold 315 and the second level 325-*b* satisfying the energy threshold 315 is associated with a logic value '0.' In some cases, the wakeup circuit may continue generating level 325 and 330 unit the last $n^{th}$ symbol of the RF signal is received—e.g., until the controller circuit receives the level 325-*n* from the first correlation chain and the level 330-*n* from the second correlation chain. In such examples, the controller may determine a representation of the code sequence transmitted by a transmitter (e.g., the transmitter 105 as described with reference to FIG. 1) based on receiving the sequence of levels 325 and 330—e.g., based on set of levels 325 and 330 for each symbol. For example, the controller may determine a representation '110 . . . 0.0' for the levels 325 and 330 illustrated in FIG. 3.

In some examples, the logic value for a given symbol may also be based on a second energy threshold 320, which may be positive or negative. For example, the controller may determine the combination of the first level 325-*a* satisfying the energy threshold 315 and the second level 325-*b* not satisfying (e.g., not being greater than, or not being greater than or equal to) the second energy threshold 320 is associated with a logic value '1'. Additional thresholds may also be used. For example, The logic value '1' may be determined for the first symbol based on either the first level 325-*a* satisfying the energy threshold 315 (e.g., regardless of the second level 330-*a*), or the first level 325-*a* satisfying the energy threshold 321 (which may be lower than the energy threshold 315) and the second level 330-*a* not satisfying the second energy threshold 320. Similarly, the logic value '0' may be determined for the third symbol based on either the level 330-*c* satisfying the energy threshold 315 (e.g., regardless of the level 325-*c*), or the level 330-*c* satisfying the energy threshold 321 and the level 325-*c* not satisfying the second energy threshold 320.

In some cases, the controller may then cross-correlate the representation of the code sequence with an assigned code sequence associated with the receiver (e.g., receiver 115 as described with reference to FIG. 1). That is, the controller may cross-correlate the determined representation (e.g., '110 . . . 0'') with the code sequence associated with activating the receiver. In some examples, the controller may determine a correlation between the received code sequence and the assigned code sequence associated with the receiver (e.g. the stored code matches exactly or matches using error correction on the received code sequence) and generate a wakeup command accordingly. In other examples, the controller may determine there is not a correlation between the received code sequence and the assigned code sequence associated with the receiver and may refrain from generating a wakeup command accordingly.

As described with reference to FIG. 2, in some examples, the wakeup circuit may include additional correlation chains based on a symbol of the signal including more than one (1) bit. In such examples, the controller may compare the output of each correlation chain with a different set of energy thresholds—e.g., with energy thresholds associated with a logic state 00, 01, 10, or 00 when there are two bits in each symbol. In such examples the controller may determine the sequence which value satisfies a given threshold for the given logic state.

Figure 4:
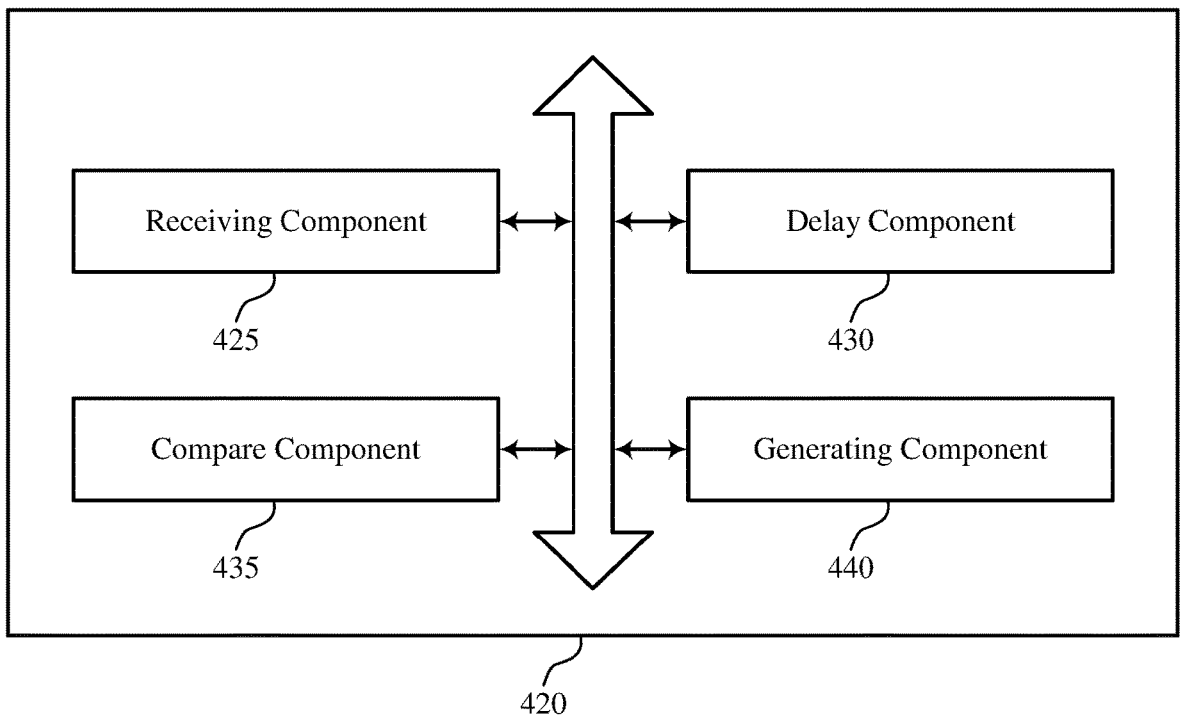
FIG. 4 shows a block diagram of a receiver that supports differential detection of spread spectrum wakeup codes in accordance with aspects of the present disclosure.

FIG. 4 shows a block diagram 400 of a receiver 420 that supports differential detection of spread spectrum wakeup codes in accordance with aspects of the present disclosure. The receiver 420 may be an example of aspects of a receiver as described with reference to FIGS. 1 through 3. The receiver 420, or various components thereof, may be an example of means for performing various aspects of differential detection of spread spectrum wakeup codes as described herein. For example, the receiver 420 may include a receiving component 425, a delay component 430, a compare component 435, a generating component 440, or any combination thereof. Each of these components may communicate, directly or indirectly, with one another (e.g., via one or more buses).

The receiving component 425 may be configured as or otherwise support a means for receiving, at an antenna, a signal comprising a code sequence, wherein each symbol of a plurality of symbols of the code sequence comprises one of a plurality of sub-sequences having a corresponding code length. In some examples, the receiving component 425 may be configured as or otherwise support a means for splitting the signal into a first component signal and a second component signal. In some examples, the receiving component 425 may be configured as or otherwise support a means for amplifying, at an amplifier, the signal, wherein splitting the signal is based at least in part on the amplification. In some examples, the receiving component 425 may be configured as or otherwise support a means for splitting the received signal into a third component signal and a fourth component signal based at least in part on receiving the signal. In some examples, the receiving component 425 may be configured as or otherwise support a means for adjusting a first impedance associated with the antenna to a second impedance associated with the amplifier.

The delay component 430 may be configured as or otherwise support a means for delaying, at a first correlation chain, the first component signal by a first amount and multiplying the first component signal with the delayed first component signal to generate a first output, where the first amount is associated with a first one of the code lengths. In some cases, the delay component 430 may be configured as or otherwise support a means for delaying, at a second correlation chain, the second component signal by a second amount and multiplying the second component signal with the delayed second component signal to generate a second output, where the second amount is associated with a second one of the code lengths. In some examples, the first amount of the delay of the delay component 430 is associated with the first one of the code lengths and the first correlation chain generates the first output based on a correlation between the first amount and the first one of the code lengths. In some instances, a logic state of at least one bit of data correspond-ing to a symbol of the plurality of symbols is based at least in part on the first output satisfying a threshold. In some cases, the second amount of the delay of the delay component 430 is associated with a second one of the code lengths and the second correlation chain generates the second output based on a correlation between the second amount and the second one of the code lengths. For the symbol, the second output may indicate that the first one of the code lengths does not correlate with the second amount of the delay, which by itself may not indicate the logic state. In some examples, the logic state of the at least one bit of data is based at least in part on the first output satisfying the threshold and the second output failing to satisfy a threshold—e.g., although the second output not satisfying the threshold by itself may not indicate the logic state, it may increase the confidence in the logic state if the first output satisfies the threshold.

In some examples, the delay component 430 may be configured as or otherwise support a means for delaying, at a third correlation chain, the third component signal by a third amount and multiplying the third component signal with the delayed third component signal to generate a third output, where the third amount is associated with a third one of the code lengths. In some examples, the delay component 430 may be configured as or otherwise support a means for delaying, at a fourth correlation chain, the fourth component signal by a fourth amount and multiplying the fourth component signal with the delayed fourth component signal to generate a fourth output, where the fourth amount is associated with a fourth one of the code lengths. In some examples, the delay component 430 may be configured as or otherwise support a means for amplifying, at a first amplifier, the first component signal, wherein delaying the first component signal is based at least in part on amplifying the first component signal. In some examples, the delay component 430 may be configured as or otherwise support a means for amplifying, at a second amplifier, the second component signal, wherein delaying the second component signal is based at least in part on amplifying the second component signal.

The compare component 435 may be configured as or otherwise support a means for determining a representation of the code sequence based at least in part on a sequence of levels of the first output and the second output over the plurality of symbols. The compare component 435 may be or include a controller coupled with the first correlation chain and the second correlation chain. In some examples, to support generating the first output, the compare component 435 may be configured as or otherwise support a means for integrating, at an integrator, the result of the multiplication between the first component signal and the delayed first component signal to generate an integrated signal. In some cases, to support generating the first output, the compare component 435 may be configured as or otherwise support a means for converting, at an analog-to-digital converter, the integrated signal to samples, wherein the first correlation chain generates the first output based at least in part on the samples. In some instances, the compare component 435 may be configured as or otherwise support a means for correlating the sequence of levels of the first output and the second output over the plurality of symbols with an assigned code sequence associated with the receiving apparatus.

In some examples, the compare component 435 may be configured as or otherwise support a means for comparing a first voltage level associated with the first output to a second voltage level associated with the second output, wherein the representation of the code sequence is based at least in part on the comparison. In some examples, the compare component 435 may be configured to determine the representation of the code sequence based at least in part on a sequence of levels of the third output and the fourth output over the plurality of symbols. In some examples, the first output, the second output, the third output, and the fourth output received by the compare component 435 are associated with two bits of data corresponding to a respective sub-sequence of the plurality of sub-sequences.

In some examples, the generating component 440 may be configured as or otherwise support a means for generating a wakeup command based at least in part on the correlation between the sequence of levels of the first output and the second output over the plurality of symbols and the assigned code sequence associated with the receiving apparatus.

Figure 5:
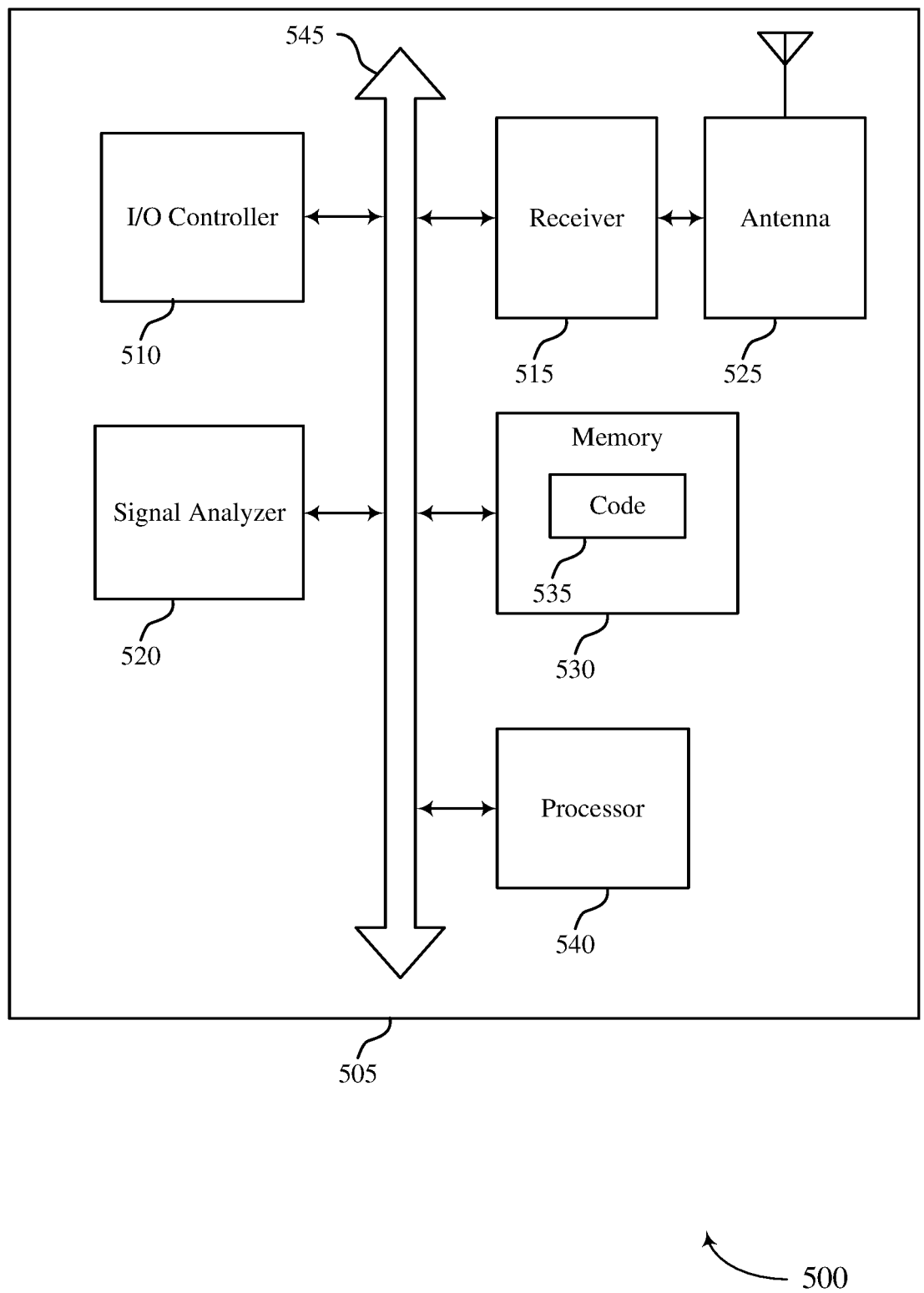
FIG. 5 shows a diagram of a system including a receiving device that supports differential detection of spread spectrum wakeup codes in accordance with aspects of the present disclosure.

FIG. 5 shows a diagram of a system 500 including a receiving device 505 that supports differential detection of spread spectrum wakeup codes in accordance with aspects of the present disclosure. The receiving device 505 may be an example of or include the components of a receiver 115 as described with reference to FIG. 1. The receiving device 505 may include components for processing signals, such as an input/output (I/O) controller 510, a receiver 515, an antenna 525, a signal analyzer 520, a memory 530, code 535, and a processor 540. These components may be in electronic communication or otherwise coupled (e.g., operatively, communicatively, functionally, electronically, electrically) via one or more buses (e.g., a bus 545).

The I/O controller 510 may manage input and output signals for the receiving device 505. The I/O controller 510 may also manage peripherals not integrated into the receiving device 505. In some cases, the I/O controller 510 may represent a physical connection or port to an external peripheral. In some cases, the I/O controller 510 may utilize an operating system such as iOS®, ANDROID®, MS-DOS®, MS-WINDOWS®, OS/2®, UNIX®, LINUX®, or another known operating system. Additionally, or alternatively, the I/O controller 510 may represent or interact with a modem, a keyboard, a mouse, a touchscreen, or a similar device. In some cases, the I/O controller 510 may be implemented as part of a processor, such as the processor 540. In some cases, a user may interact with the receiving device 505 via the I/O controller 510 or via hardware components controlled by the I/O controller 510.

In some cases, antenna 525 may be a single antenna. In some other cases, the antenna 525 may include multiple antennas (or antenna elements), which may be capable of concurrently transmitting or receiving multiple RF signals (e.g., RF signal 130 as described with reference to FIG. 1) or other transmission of data. The receiver 515 may communicate bi-directionally with the one or more antennas 525. For example, the receiver 515 may receive RF signals or data signals from the antenna 525. The receiver 515 may also include a modem to modulate the packets, to provide the modulated packets to one or more antennas 525 for transmission, and to demodulate packets received from the one or more antennas 525. For example, the receiver 515 may transmit data or signals to an external transmitter (e.g., transmitter 105 as described with reference to FIG. 1)

The memory 530 may include random-access memory (RAM) and read-only memory (ROM). The memory 530 may store code 535. Code 535 may be computer-readable and computer-executable code and may include instructions that, when executed by the processor 540, cause the receiving device 505 to perform various functions described herein. The code 535 may be stored in a non-transitory computer-readable medium such as system memory or another type of memory. In some cases, the code 535 may not be directly executable by the processor 540 but may cause a computer (e.g., when compiled and executed) to perform functions described herein. In some cases, the memory 530 may contain, among other things, a basic input/output system (BIOS) which may control basic hardware or software operation such as the interaction with peripheral components or devices.

The processor 540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 540 may be configured to operate a memory array using a memory controller. In some other cases, a memory controller may be integrated into the processor 540. The processor 540 may be configured to execute computer-readable instructions stored in a memory (e.g., the memory 530) to cause the receiving device 505 to perform various functions (e.g., functions or tasks supporting differential detection of spread spectrum wakeup codes). For example, the receiving device 505 or a component of the receiving device 505 may include a processor 540 and memory 530 coupled to the processor 540, the processor 540 and memory 530 configured to perform various functions described herein. Processor 540 may include (or be an example of) an controller 240 as described with reference to FIG. 2.

The signal analyzer 520 may support signal analysis at the receiver 115 as described with reference to FIG. 2. For example, the signal analyzer 520 may be configured as or otherwise support a means for determining a representation of the code sequence based at least in part on a sequence of levels of the first output and the second output over the plurality of symbols. The signal analyzer 520 may be configured as or otherwise support a means for correlating the sequence of levels of the first output and the second output over the plurality of symbols with an assigned code sequence associated with the receiver 515. The signal analyzer 520 may be configured as or otherwise support a means for comparing a first voltage level associated with the first output to a second voltage level associated with the second output, wherein the representation of the code sequence is based at least in part on the comparison.

In some examples, the signal analyzer 520 may be configured to perform various operations (e.g., receiving, monitoring, transmitting) using or otherwise in cooperation with the receiver 515, the one or more antennas 525, or any combination thereof. Although the signal analyzer 520 is illustrated as a separate component, in some examples, one or more functions described with reference to the signal analyzer 520 may be supported by or performed by the processor 540, the memory 530, the code 535, or any combination thereof. For example, the code 535 may include instructions executable by the processor 540 to cause the receiving device 605 to perform various aspects of differential detection of spread spectrum wakeup codes as described herein, or the processor 540 and the memory 530 may be otherwise configured to perform or support such operations.

Figure 6:
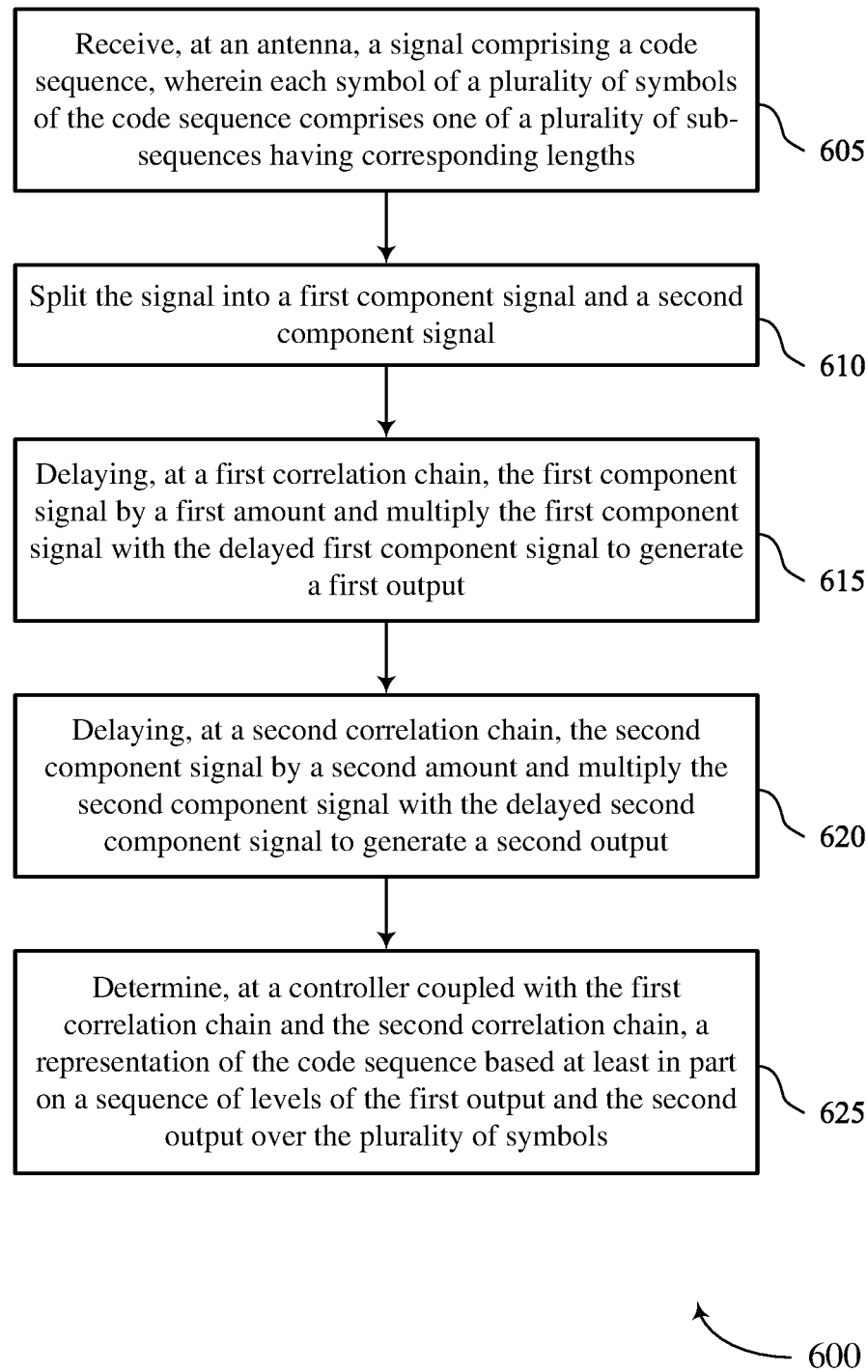
FIG. 6 shows a flowchart illustrating methods that support differential detection of spread spectrum wakeup codes in accordance with aspects of the present disclosure.

FIG. 6 shows a flowchart illustrating a method 600 that supports differential detection of spread spectrum wakeup codes in accordance with aspects of the present disclosure. The operations of the method 600 may be implemented by a receiver or its components as described herein. For example, the operations of the method 600 may be performed by a receiver as described with reference to FIGS. 1 through 5. In some examples, a receiver may execute a set of instructions to control the functional elements of the receiver to perform the described functions. Additionally or alternatively, the receiver may perform aspects of the described functions using special-purpose hardware.

At 605, the method may include receiving, at an antenna, a signal comprising a code sequence, wherein each symbol of a plurality of symbols of the code sequence comprises one of a plurality of sub-sequences having corresponding lengths. The operations of 605 may be performed in accordance with examples as disclosed herein. In some examples, aspects of the operations of 605 may be performed by a receiving component 425 as described with reference to FIG. 4.

At 610, the method may include splitting the signal into a first component signal and a second component signal. The operations of 610 may be performed in accordance with examples as disclosed herein. In some examples, aspects of the operations of 610 may be performed by a receiving component 425 as described with reference to FIG. 4.

At 615, the method may include delaying, at a first correlation chain, the first component signal by a first amount and multiplying the first component signal with the delayed first component signal to generate a first output, where the first amount is associated with a first one of the code lengths. The operations of 615 may be performed in accordance with examples as disclosed herein. In some examples, aspects of the operations of 615 may be performed by a delay component 430 as described with reference to FIG. 4.

At 620, the method may include delaying, at a second correlation chain, the second component signal by a second amount and multiplying the second component signal with the delayed second component signal to generate a second output, where the second amount is associated with a second one of the code lengths. The operations of 620 may be performed in accordance with examples as disclosed herein. In some examples, aspects of the operations of 620 may be performed by a delay component 430 as described with reference to FIG. 4.

At 625, the method may include determining, at a controller coupled with the first correlation chain and the second correlation chain, a representation of the code sequence based at least in part on a sequence of levels of the first output and the second output over the plurality of symbols. The operations of 625 may be performed in accordance with examples as disclosed herein. In some examples, aspects of the operations of 625 may be performed by a compare component 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, at an antenna, an signal comprising a code sequence, wherein each symbol of a plurality of symbols of the code sequence comprises one of a plurality of sub-sequences having corresponding lengths, splitting the signal into a first component signal and a second component signal, delaying, at a first correlation chain, the first component signal by a first amount and multiplying the first component signal with the delayed first component signal to generate a first output, where the first amount is associated with a first one of the code lengths, delaying, at a second correlation chain, the second component signal by a second amount and multiplying the second component signal with the delayed second component signal to generate a second output, where the second amount is associated with a second one of the code lengths, and determining, at a controller coupled with the first correlation chain and the second correlation chain, a representation of the code sequence based at least in part on a sequence of levels of the first output and the second output over the plurality of symbols.

In some cases of the method 600 and the apparatus described herein, amplifying, at an amplifier, the signal, wherein splitting the signal may be based at least in part on the amplification.

In some instances of the method 600 and the apparatus described herein, the first correlation chain generates the first output based on a correlation between the first amount and the first one of the code lengths.

In some examples of the method 600 and the apparatus described herein, a logic state of at least one bit of data corresponding to a symbol of the plurality of symbols may be based at least in part on the first output satisfying a threshold.

In some cases of the method 600 and the apparatus described herein, the second correlation chain generates the second output based on a correlation between the second amount and the second one of the code lengths.

In some instances of the method 600 and the apparatus described herein, the logic state of the at least one bit of data may be based at least in part on the second output failing a satisfy the threshold.

In some cases of the method 600 and the apparatus described herein, generating the first output may include operations, features, circuitry, logic, means, or instructions for integrating, at an integrator, the result of the multiplication between the first component signal and the delayed first component signal to generate an integrated signal, where generating the first output is based at least in part on generating the integrated signal.

In some instances of the method 600 and the apparatus described herein, generating the first output may include operations, features, circuitry, logic, means, or instructions for converting, at an analog-to-digital converter, the integrated signal to samples, wherein the first correlation chain generates the first output based at least in part on the samples.

Some examples of the method 600 and the apparatus described herein may further include operations, features, means, or instructions for correlating the sequence of levels of the first output and the second output over the plurality of symbols with an assigned code sequence associated with the receiving apparatus.

Some instances of the method 600 and the apparatus described herein may further include operations, features, means, or instructions for generating a wakeup command based at least in part on the correlation between the sequence of levels of the first output and the second output over the plurality of symbols and the assigned code sequence associated with the receiving apparatus.

Some cases of the method 600 and the apparatus described herein may further include operations, features, means, or instructions for comparing a first voltage level associated with the first output to a second voltage level associated with the second output, wherein the representation of the code sequence may be based at least in part on the comparison.

Some examples of the method 600 and the apparatus described herein may further include operations, features, means, or instructions for splitting the received signal into a third component signal and a fourth component signal based at least in part on receiving the signal, delaying, at a third correlation chain, the third component signal by a third amount and multiplying the third component signal with the delayed third component signal to generate a third output, where the third amount is associated with a third one of the code lengths, and delaying, at a fourth correlation chain, the fourth component signal by a fourth amount and multiplying the fourth component signal with the delayed fourth component signal to generate a fourth output where the fourth amount is associated with a fourth one of the code lengths.

Some instances of the method 600 and the apparatus described herein may further include operations, features, means, or instructions for determining the representation of the code sequence may be based at least in part on a sequence of levels of the third output and the fourth output over the plurality of symbols.

In some cases of the method 600 and the apparatus described herein, the first output, the second output, the third output, and the fourth output may be associated with two bits of data corresponding to a respective sub-sequence of the plurality of sub-sequences.

In some examples of the method 600 and the apparatus described herein, amplifying, at a first amplifier, the first component signal, wherein delaying the first component signal may be based at least in part on amplifying the first component signal and amplifying, at a second amplifier, the second component signal, wherein delaying the second component signal may be based at least in part on amplifying the second component signal.

Some cases of the method 600 and the apparatus described herein may further include operations, features, means, or instructions for adjusting a first impedance associated with the antenna to a second impedance associated with the amplifier.

An apparatus is described. The apparatus may include an antenna configured to receive an signal comprising a code sequence, wherein each symbol of a plurality of symbols of the code sequence comprises one of a plurality of sub-sequences having corresponding code lengths, a splitter configured to split the received signal into a first component signal and a second component signal, a first correlation chain configured to delay the first component signal by a first amount and multiply the first component signal with the delayed first component signal to generate a first output, where the first amount is associated with a first one of the code lengths, a second correlation chain configured to delay the second component signal by a second amount and multiply the second component signal with the delayed second component signal to generate a second output, where the second amount is associated with a second one of the code lengths, and a controller configured to receive the first output and the second output and determine a representation of the code sequence based at least in part on a sequence of levels of the first output and the second output over the plurality of symbols.

In some examples of the apparatus, the first correlation chain further comprises an amplifier configured to amplify the first component signal.

In some instances of the apparatus, the first correlation chain further comprises a delay line filter configured to delay the first component signal by the first amount.

In some cases of the apparatus, the first correlation chain may be configured to generate the first output based on a correlation between the first amount and the first one of the code lengths. For example, the first correlation chain may generate, for a symbol comprising a sub-sequence having a first one of the code lengths, a level at the first output that satisfies a threshold if the first one of the code lengths correlates with the first amount and may generate a level at the first output that does not satisfy the threshold if the first one of the code lengths does not correlate with the first amount.

In some instances of the apparatus, a logic state of at least one bit of data corresponding to a symbol of the plurality of symbols may be based at least in part on the first output satisfying a threshold.

In some cases of the apparatus, the second correlation chain may be configured to generate the second output based on a correlation between the second amount and the second one of the code lengths. For example, the second correlation chain may generate, for a symbol comprising a sub-sequence having a first one of the code lengths, a level at the second output that satisfies a threshold if the first one of the code lengths correlates with the second amount and may generate a level at the second output that does not satisfy the threshold if the first one of the code lengths does not correlate with the second amount.

In some examples of the apparatus, the logic state of the at least one bit of data may be based at least in part on the first output satisfying the threshold and the second output failing to satisfy the threshold. That is, although a level of an output failing to satisfy the threshold by itself may not indicate the logic state, it may increase confidence in a logic state indicated by the level of a different output satisfying the threshold.

In some instances of the apparatus, the first correlation chain further comprises an integrator configured to integrate the result of the multiplication between the first component RF signal and the delayed first component RF signal to generate an integrated signal, where the first correlation chain is configured to generate the first output based at least in part on the integrated signal.

In some cases of the apparatus, the first correlation chain further comprises an analog-to-digital converter configured to convert the integrated signal to samples, wherein the first correlation chain may be configured to generate the first output based at least in part on the samples.

In some examples of the apparatus, the controller further comprises a correlator configured to correlate the sequence of levels of the first output and the second output over the plurality of symbols with an assigned code sequence associated with the receiving apparatus.

In some instances of the apparatus, the controller may be further configured to generate a wakeup command based at least in part on the correlation between the sequence of levels of the first output and the second output over the plurality of symbols and the assigned code sequence associated with the receiving apparatus.

In some cases of the apparatus, the controller may be further configured to compare a first voltage level associated with the first output to a second voltage level associated with the second output, wherein the representation of the code sequence may be based at least in part on the comparison.

In some examples of the apparatus, the receiving apparatus further comprises a third correlation chain configured to delay the third component signal by a third amount and multiply the third component signal with the delayed third component signal to generate a third output, where the third amount is associated with a third one of the code lengths and a fourth correlation chain configured to delay the fourth component signal by a fourth amount and multiply the fourth component signal with the delayed fourth component signal to generate a fourth output, where the fourth amount is associated with a fourth one of the code lengths.

In some instances of the apparatus, the controller may be further configured to receive the third output and the fourth output, wherein the controller may be configured to determine the representation of the code sequence based at least in part on a sequence of levels of the third output and the fourth output over the plurality of symbols.

In some cases of the apparatus, the first output, the second output, the third output, and the fourth output may be associated with two bits of data corresponding to a respective sub-sequence of the plurality of sub-sequences.

In some instances of the apparatus, an amplifier coupled to the antenna and the splitter and configured to amplify the signal.

In some examples of the apparatus, a transformer coupled with the antenna and configured to adjust a first impedance associated with the antenna to a second impedance associated with the amplifier.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A receiving apparatus, comprising:
a splitter configured to split a received signal into multiple component signals, wherein the multiple component signals are like copies of the received signal and the received signal comprises a plurality of symbols conveying a code sequence, each symbol comprising one or more repetitions of one sub-sequence among a set of sub-sequences of different lengths, and each sub-sequence representing one logic value among a set of logic values used to form code sequences;
multiple correlation chains, each correlation chain operating on a respective one of the multiple component signals and configured to generate a correlation output, based on autocorrelating the respective component signal using a delay matched to the length of a respective one of the sub-sequences in the set of sub-sequences, such that a corresponding set of correlation outputs is generated for each symbol of the received signal, each correlation result in each corresponding set of correlation results corresponding to a respective one of the sub-sequences in the set of sub-sequences; and
a controller configured to determine the received code sequence from the corresponding set of correlation outputs generated for each symbol, over the plurality of symbols.

2. The receiving apparatus of claim 1, wherein, as a consequence of each correlation chain having its autocorrelation delay aligned with the length of a respective one of the sub-sequences, the corresponding set of correlation outputs generated for each symbol together indicate which sub-sequence is comprised in the symbol and the controller is configured to determine the received code sequence according to those indications over the plurality of symbols.

3. The receiving apparatus of claim 1, wherein, for each symbol in the plurality of symbols, the controller is configured to detect which one of the sub-sequences is conveyed by the symbol, based on detecting that a particular one of the correlation chains yields a high correlation output for the symbol, while the remaining one or ones of the correlation chains yield low correlation outputs for the symbol.

4. The receiving apparatus of claim 1, wherein each correlation chain generates an autocorrelation signal based on autocorrelating the respective component signal using the delay matched to the length of the respective one of the sub-sequences, and includes an integrator configured to integrate the autocorrelation signal, to obtain an integrated signal, and an analog-to-digital converter (ADC) configured to sample the integrated signal and output a corresponding sampled signal for each symbol of the received signal, as a respective one of the correlation outputs in the corresponding set of correlation outputs generated for the symbol.

5. The receiving apparatus of claim 4, wherein the controller is configured to detect which sub-sequence is conveyed in each symbol by determining that, with respect to reception of the symbol, one of the correlation outputs in the corresponding set of correlation outputs is at or above a first threshold level while the remaining one or ones of the correlation outputs in the corresponding set of correlation outputs are at or below a second threshold level that is lower than the first threshold level.

6. The receiving apparatus of claim 1, wherein the controller is configured to determine the received code sequence as comprising the sequence of logic values represented by the sequence of sub-sequences conveyed over the plurality of symbols.

7. The receiving apparatus of claim 1, wherein the receiving apparatus has an assigned code sequence and wherein the controller is configured to generate a wakeup command in dependence on determining whether the received code sequence matches the assigned code sequence.

8. The receiving apparatus of claim 1, wherein the logic values are binary values and wherein the number of correlation chains included in the receiving apparatus is based on the number of bits conveyed by each symbol.

9. The receiving apparatus of claim 8, wherein the receiving apparatus comprises $2^n$ correlation chains, where n is greater than or equal to 1 and each symbol conveys n bits.

10. The receiving apparatus of claim 1, wherein the symbols are of uniform duration and wherein the number of sub-sequence repetitions contained within each symbol depends on the length of the particular sub-sequence conveyed by the symbol.

11. The receiving apparatus of claim 1, further comprising an antenna for receiving the received signal, an amplifier for amplifying the received signal for splitting by the splitter, and a transformer for impedance-matching between the antenna and an input of the amplifier.

12. A method performed by a receiving apparatus, the method comprising:
receiving a signal comprising a plurality of symbols conveying a code sequence, each symbol comprising one or more repetitions of one sub-sequence among a set of sub-sequences of different lengths, and each sub-sequence representing one logic value among a set of logic values used to form code sequences;
splitting the signal into multiple component signals that are like copies of the received signal;
autocorrelating each component signal using an autocorrelation delay matched to the length of a respective one of the sub-sequences in the set of sub-sequences, to generate a corresponding set of correlation outputs for each symbol, each correlation output in each corresponding set of correlation outputs corresponding to a respective one of the sub-sequences in the set of sub-sequences; and
determining the received code sequence from the corresponding set of correlation outputs generated for each symbol, over the plurality of symbols.

13. The method of claim 12, wherein, as a consequence of each correlation chain having its autocorrelation delay aligned with the length of a respective one of the sub-sequences, the corresponding set of correlation outputs generated for each symbol together indicate which sub-sequence is comprised in the symbol and the determining the received code sequence from the correlation outputs comprises determining the received code sequence according to the indications over the plurality of symbols.

14. The method of claim 12, wherein the method includes, for each symbol in the plurality of symbols, detecting which one of the sub-sequences is conveyed by the symbol, based on detecting that a particular one of the correlation chains yields a high correlation output for the symbol, while the remaining one or ones of the correlation chains yield low correlation outputs for the symbol.

15. The method of claim 12, wherein autocorrelating each component signal using the autocorrelation delay matched to the length of the respective one of the sub-sequences in the set of sub-sequences comprises processing each component signal in a respective correlation chain, each correlation chain generating an autocorrelation signal based on autocorrelating the component signal using a delay matched to a particular one of the sub-sequences in the set of sub-sequences, integrating the autocorrelation signal to obtain an integrated signal and sampling the integrated signal to obtain a sampled signal as a respective one of the correlation outputs in the corresponding set of correlation outputs generated for each symbol.

16. The method of claim 15, wherein detecting which sub-sequence is conveyed in each symbol comprises determining that, with respect to reception of the symbol, one of the correlation outputs in the corresponding set of correlation outputs generated for each symbol is at or above a first threshold level while the remaining one or ones of the correlation outputs in the corresponding set of correlation outputs are at or below a second threshold level that is lower than the first threshold level.

17. The method of claim 15, wherein the number of component signals into which the received signal is split depends on the number of bits conveyed in each symbol, wherein the number of bits corresponds to the logic values represented by the respective sub-sequences.

18. The method of claim 17, wherein the signal is split into $2^n$ component signals, each component signal processed in a corresponding correlation chain, where n is greater than or equal to 1 and each symbol conveys n bits.

19. The method of claim 12, wherein determining the received code sequence from the corresponding set of correlation outputs generated for each symbol, over the plurality of symbols, comprises determining the received code sequence as comprising the sequence of logic values represented by the sequence of sub-sequences conveyed over the plurality of symbols.

20. The method of claim 12, wherein the receiving apparatus has an assigned code sequence and wherein the method further comprises generating a wakeup command in dependence on determining whether the received code sequence matches the assigned code sequence.

21. The method of claim 12, wherein the symbols are of uniform duration and wherein the number of sub-sequence repetitions contained within each symbol depends on the length of the particular sub-sequence conveyed by the symbol.

* * * * *